July 21, 1964     C. A. NEWBY     3,141,548
MICROSCOPE SLIDE STRUCTURE
Filed Dec. 20, 1962

INVENTOR.
CHESTER A. NEWBY
BY
ATTORNEYS

United States Patent Office 3,141,548
Patented July 21, 1964

3,141,548
MICROSCOPE SLIDE STRUCTURE
Chester A. Newby, 3450 Yosemite Ave.,
Minneapolis 16, Minn.
Filed Dec. 20, 1962, Ser. No. 246,178
1 Claim. (Cl. 206—1)

This invention relates to an improvement in a microscope slide structure. More particularly, this invention relates to an integral structure comprising a plurality of specimen receiving chambers and a common cover member removably sealing said chambers.

It is an object of this invention to provide a microscope slide structure comprising a plurality of specimen receiving chambers and a common cover member for readily covering or uncovering said chambers.

It is another object of this invention to provide a microscope slide structure such as above indicated which may be simply and inexpensively manufactured.

It is a further object of this invention to provide a microscope slide structure comprising a base plate member having a plurality of aligned projections formed therefrom at one side thereof, said projections forming specimen receiving chambers having their open sides respectively in the plane of said plate member, a flange at either side of said plate member in opposed relation transversely of said chambers, opposed grooves longitudinally of said plate member formed in said flange portions and having inwardly facing open sides and an elongated cover member slidable in said grooves to removably cover the open sides of said chambers.

These and other objects and advantages of the invention will be fully set forth in the following description made in connection with the accompanying drawings in which like reference characters refer to similar parts throughout the several views and in which.

Figure 1:
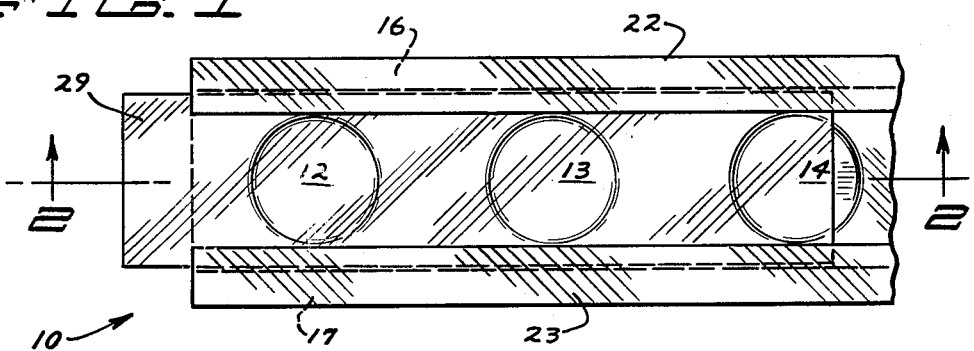
FIG. 1 is a broken portion of a top plan view of applicant's device with portions shown in dotted line.
Figure 2:
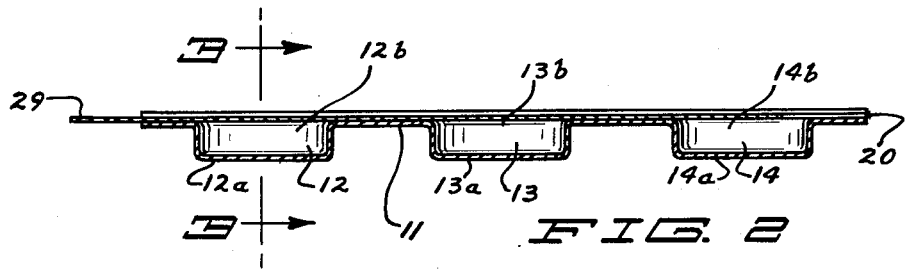
FIG. 2 is a view in longitudinal vertical section taken on line 2—2 of FIG. 1 as indicated.
Figure 3:
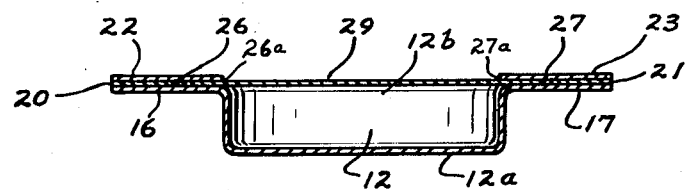
FIG. 3 is a view in vertical cross section taken on line 3—3 of FIG. 2 as indicated.

Referring to the drawings, applicant's device 10 is shown in a broken view in FIG. 1 comprising an elongated base plate member 11 which may be of any desired length and preferably will be substantially rectangular in plan. Said plate member will be formed of transparent sheet material of a composition adapted to have formed thereof projecting portions 12, 13 and 14 pressed outwardly at one side thereof, such as by a conventional draw process. Plastic sheet material has been found to be very suitable in connection with this treatment. In the present embodiment, said projecting portions are indicated as being substantially cylindrical in form having closed ends 12a, 13a and 14a remote from said plate member 11 and having open ends 12b, 13b and 14b in the plane of said plate member. Said chambers are indicated as projecting from the lower side of said plate member. It has been found that as a practical convenience it is desirable to have on the order of a half a dozen chambers such as the chambers 12–14 formed in connection with each base plate member 11, and it will be understood that said base plate member 11 will be of a length to accommodate such a number of chambers.

Extending longitudinally of said base plate member 11 forming the marginal portions thereof are flange portions 16 and 17. It is seen that such flange portions are in opposed relation to one another transversely of said chambers.

Overlying said flange portions adjacent their outer edge portions at the upper side of said plate member are strips 20 and 21 which form spacer strips. Said spacer strips are quite narrow in width and are on the order of one-half of the width of said flange portions. Overlying said spacer strips and being of somewhat greater width than said spacer strips to overhang the same inwardly thereof are strip members 22 and 23. It is seen that the adjacent or inner edge portions of said strip members 22 and 23 are spaced vertically from underlying flange portions 16 and 17 forming grooves 26 and 27 therebetween with said grooves having facing open sides 26a and 27a.

Slidable in said grooves is a cover plate 29 of substantially rigid transparent sheet material which will be of the length of said base plate member 11 to removably seal the open sides of said chambers 12–14.

Operation

The operation of the device above described is quite apparent from the description thereof.

This device is particularly useful for the collection of dry specimen material, such as on field trips, with a plurality of specimen receiving chambers being conveniently formed in a single base plate or holding member with a readily slidable cover to seal the chambers in sequence or all at one time, as may be desired. Transparent plastic material has been indicated as being suitable in forming applicant's device. This is convenient to use as it is practically unbreakable and has sufficient optical quality to provide for satisfactory observation and study under a microscope. Applicant's device is relatively inexpensive to manufacture and is particularly recommended for elementary science studies, such as in elementary schools or in the pursuit of hobbies of this nature as by young people.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claim.

What is claimed is:

A container in the form of a miniature aquarium for microorganisms and adapted to be used as a microscope slide having in combination,
    an elongated plate member facing upwardly having a row of aligned depending projecting portions integral therewith forming chambers,
    said chambers respectively having open sides in the plane of said plate member,
    said plate member having flange portions at either side of said row of chambers,
    a pair of relatively narrow spacer strip members respectively overlying the longitudinal free edge portions of said flange portions,
    a second pair of elongated strip members having a greater width than said first mentioned strip members and respectively overlying said first mentioned strip members and extending inwardly thereof in spaced relation to the underlying portions of said flange portions forming therewith a pair of facing grooves, and a cover plate member slidable within said grooves having a sealing engagement with the top and bottom surfaces of said grooves and overlying the open sides of said chambers to seal the same.

References Cited in the file of this patent

UNITED STATES PATENTS

| | | |
|---|---|---|
| 2,318,850 | Grant | May 11, 1943 |
| 2,428,498 | McWilliams | Oct. 7, 1947 |
| 2,521,792 | Hollander | Sept. 12, 1950 |
| 2,908,383 | Vogt | Oct. 13, 1959 |
| 2,971,638 | Allison | Feb. 14, 1961 |
| 2,985,296 | Kahn | May 23, 1961 |
| 2,993,590 | Denton | July 25, 1961 |
| 3,054,503 | Hartman | Sept. 18, 1962 |

FOREIGN PATENTS

| | | |
|---|---|---|
| 655,998 | Great Britain | Aug. 8, 1951 |